United States Patent [19]

Tuson

[11] 4,142,820

[45] Mar. 6, 1979

[54] PIVOTAL CONNECTING DEVICE FOR PIVOTALLY CONNECTING AN OFF-SHORE ARTICULATED COLUMN STRUCTURE TO A SEA BOTTOM

[75] Inventor: Samuel Tuson, Mesnil-le-Roi, France

[73] Assignee: Enterprise d'Equipments Mecaniques et Hydrauliques E.M.H., France

[21] Appl. No.: 868,299

[22] Filed: Jan. 10, 1978

[30] Foreign Application Priority Data

Jan. 13, 1977 [FR] France ............................ 77 00875
Oct. 18, 1977 [FR] France ............................ 77 31304

[51] Int. Cl.² ................... E02B 17/00; B63B 21/50
[52] U.S. Cl. ........................... 405/202; 114/267; 175/7
[58] Field of Search ............... 61/95; 9/8 P; 166/0.5; 175/7; 74/9; 114/267; 141/387, 388

[56] References Cited

U.S. PATENT DOCUMENTS

| | | | |
|---|---|---|---|
| 3,522,709 | 8/1970 | Vilain | 61/95 |
| 3,626,701 | 12/1971 | Laffont | 61/95 |
| 3,720,066 | 3/1973 | Vilain | 61/95 |
| 3,766,582 | 10/1973 | Lloyd et al. | 61/95 X |

Primary Examiner—Jacob Shapiro
Attorney, Agent, or Firm—Steinberg & Blake

[57] ABSTRACT

A universal Cardan joint coupling device for pivotally connecting an off-shore oil-field working articulated column to a base member resting or anchored on the sea bed, wherein the improvement consists in that at least one of the pivot axes of said joint is connected to two supports rigidly connected to said base member and provided on either side of said joint, by means of two lock-bolt means aligned and displaceable along said axis and adapted to cooperate with bolt-clasps or keepers provided in said supports.

26 Claims, 10 Drawing Figures

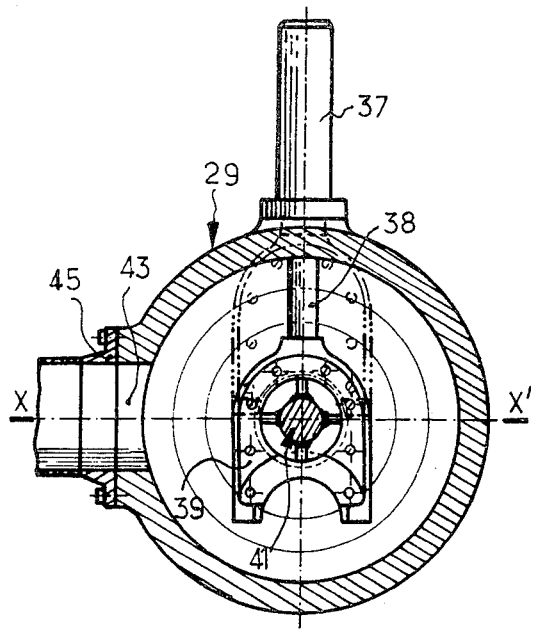
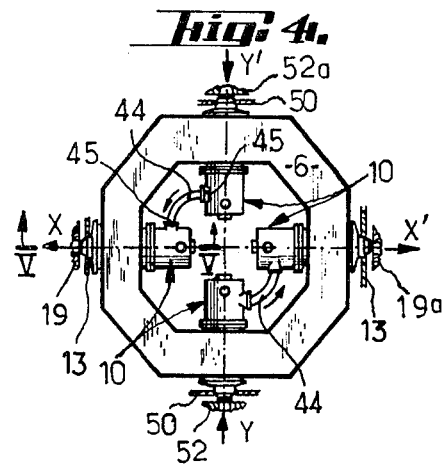
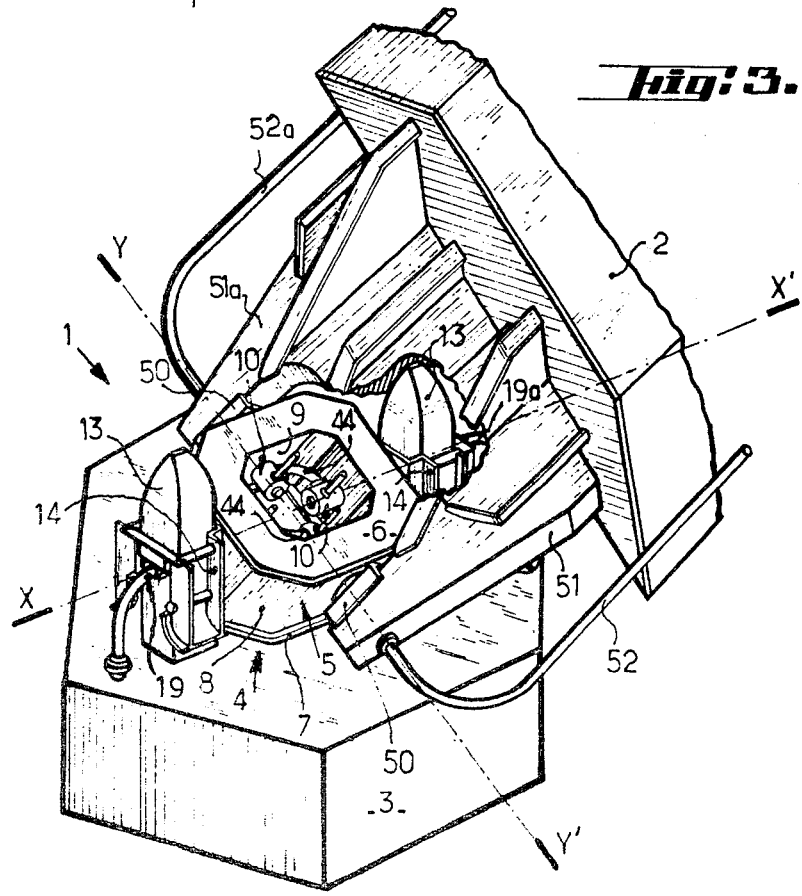

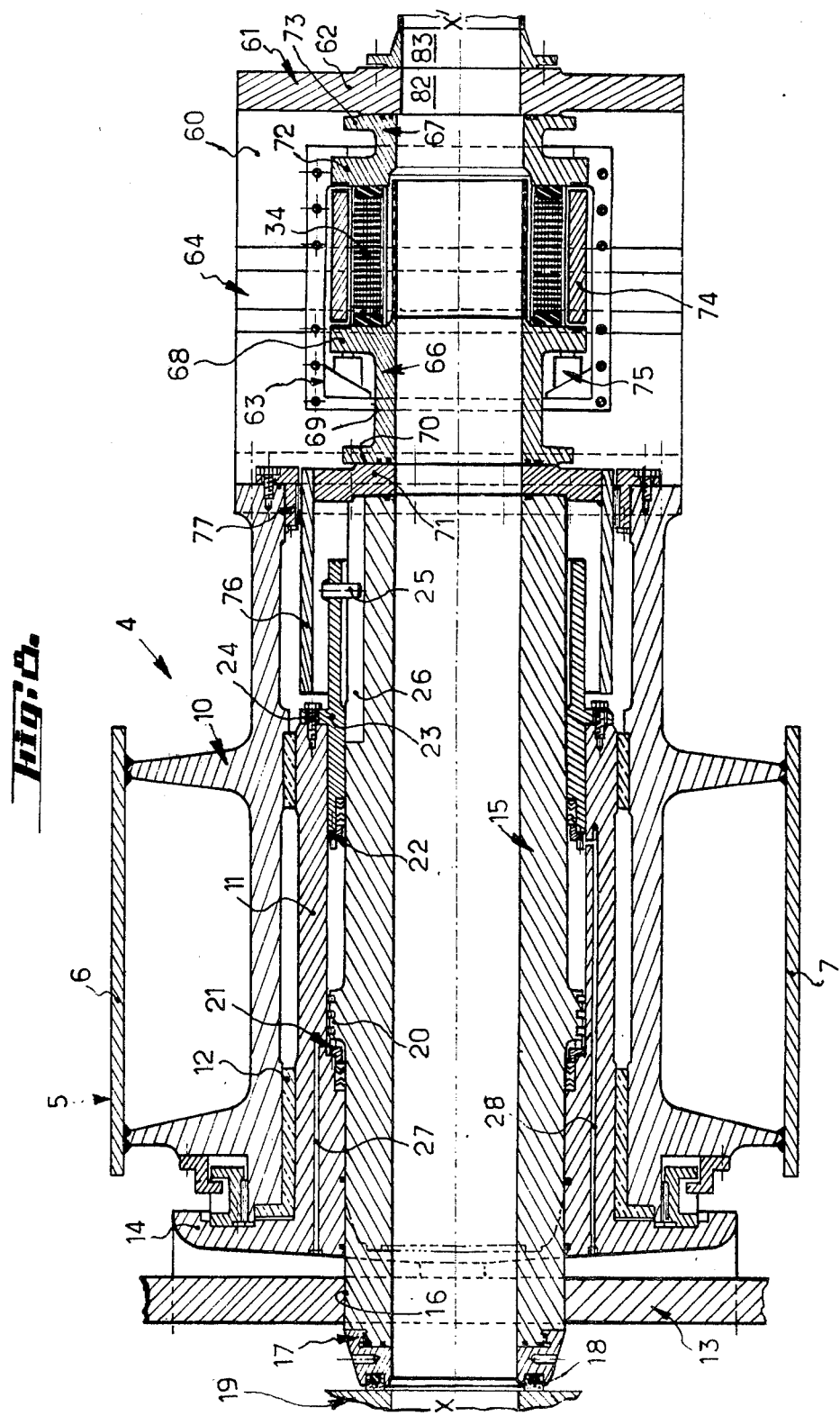

PIVOTAL CONNECTING DEVICE FOR PIVOTALLY CONNECTING AN OFF-SHORE ARTICULATED COLUMN STRUCTURE TO A SEA BOTTOM

The present invention relates to pivotal connection devices or systems in particular of the universal joint type forming a so-called mechanical Cardan coupling or Hooke's joint, removably connecting the lower end of an off-shore oil-field working articulated or oscillating column, tower or like compliant platform construction to a base member resting on or secured to a sea bed or bottom or like marine floor in oil-field working or other plants.

A main object of the invention is to make such connecting devices or systems less bulky or cumbersome, less heavy, less expensive as well as simpler and quicker to be mounted or installed.

It mainly consists in directly securing the pivotal connection of such an arrangement to the base member by securing one of the axes ot that pivotal connection and in particular one of the two pivot axes of the Cardan spider if the pivotal connection is a universal Cardan joint coupling with its two opposite aligned end portions or pivot pins for instance, to two supports, respectively, rigidly connected to the base member and positioned on either side of said pivotal connection, by means of two locking means or lock-bolts displaceable along said axis. Said supports preferably consist of two posts or upstanding arms projecting upward substantially in spaced parallel symmetrical relationship from said substantially stationary base member to form with the latter the stationary one of the two yokes or forked components of said universal Cardan joint coupling.

In order to facilitate the mounting operation of the pivotal connection onto both supports forming a kind of prongs provided for instance with pointed tops and secured in substantially vertically extending relationship onto the base member and according to another characterizing feature of the invention the pivotal connection is fitted with guide members adapted to provide for the horizontal positioning of the pivotal connection with respect to the base member by vertically sliding along the walls of said arm-like or post-shaped supports.

With such a type of articulated column the fluid-conveying passage-ways between the column and the base members are provided by pipe-lines or ducts arranged outside of the pivotal connection. In view of the oscillatory motions of the column such ducts or pipe-lines should however be flexible or yielding in particular at the pivotal connection i.e. in their portions located substantially between the foot or bottom end of the column and the base member.

In order to get at least partially rid of such a constraining flexibility requirement for the ducts or pipelines by reducing or wholly dispensing with the flexible connecting ducts or hoses and by substituting therefor a connecting device kinematically consistent with the relative notions of the column and according to a further characterizing feature of the invention at least one fluid-carrying passage-way through the Cardan joint is combined with the arrangement for locking the Cardan joint to the base member.

For this purpose and according to still another characterizing feature of the pivotal connection between two structures consisting of a sea-floor exploitation column and of its base member placed onto the sea bottom, respectively, which pivotal connection comprises a universal Cardan joint coupling with a spider pivotally connected to the base member and to the column, respectively, along two axes of rotation at right angles to each other with suitable interconnection of the fluid-conveying ducts or pipe-lines provided on said base member and on said column, respectively, said spider is removably connected to one of said structures by connecting means made immovable or held against motion by means of two selectively retractable lock-bolts arranged to be aligned in substantially registering relationship with and to be movable along said pivot axis between said spider and said other structure which is formed to this end with the other two-arm yoke or forked member of the Cardan joint.

According to still another characterizing feature of the invention said pipe connection comprises at least one pair of rotary or swivel fluid passage-way joints which are coaxial with both cross-pin pivot axes of the Cardan joint coupling, respectively, and mounted between the base member and the cross-spin spider of the Cardan joint and between the column and the cross-pin spider of the Cardan joint, respectively.

According to a further characterizing feature of the invention said lock-bolt which forms a part of an aforesaid rotary joint consists of a tubular or hollow pin open at its two opposite ends and removably engageable in substantially sealing or fluid-tight relationship with said base member or said column, said cross-pin spider being connected to the column-borne or to the base member-bound pipe-line or duct.

According to still another characterizing feature of the invention the rotatable of revolving connection between both aforesaid component parts of each rotary joint consists of a deformable packing or sealing member mounted between both component parts of the rotary joint.

According to still another characterizing feature of the invention said packing or sealing member is fast with one of said two component parts of each rotary joint and is in sealing pressed sliding engagement with the other component part while preferably forming a torsion or twistable joint packing or sealing member.

According to still a further characterizing feature of the invention said packing or sealing member consists of an annular sleeve element coaxially surrounding the lock-bolt forming one component part of each rotary joint while being fixedly secured for instance with one end thereof to said cross-pin spider structure and having its other end simply bearing in pressed relationship against a corresponding ring-like shoulder or flange of said lock-bolt which shoulder or flange is formed at the inner end thereof.

The invention will be better understood and further objects, characterizing features, advantages and details thereof will appear more clearly as the following explanatory description proceeds with reference to the accompanying diagrammatic drawings given by way of non-limiting examples only illustrating various presently preferred specific embodiments of the invention and wherein:

FIG. 3 is a partial perspective view of a pivotal connection system according to a second embodiment of the invention;

FIG. 4 is a partial bottom view of the pivotal connection system shown in FIG. 3;

FIG. 6 is a cross-sectional view taken upon the line VI-VI of FIG. 5;

FIG. 8 is a cross-sectional view drawn on a larger scale and taken upon the line VIII—VIII of FIG. 7;

Figure 1:
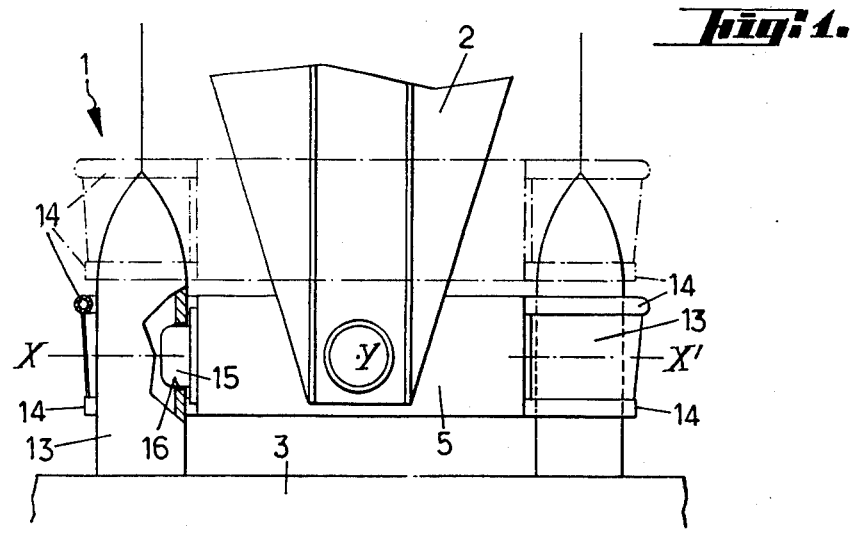
FIG. 1 is a partial elevational view showing the lower end portion of an off-shore column secured by means of a universal Cardan joint coupling to an underwater base member according to the invention.

According to the invention in order to secure the lower end portion of a working platform or column 2 (FIG. 1) to a submarine base member 3 anchored or fastened to the ground, through the agency of a pivotal connecting system 1 comprising a universal Cardan joint coupling, the following or a similar arrangement should be used.

By way of examplary illustration if should be pointed out that in the known or prior art constructions the universal Cardan joint coupling or at least its lower half part or yoke component is carried by a foot member, pedestal or like holder which is secured and locked onto the base member proper.

The machining, assembling and installing or mounting work steps are therefore carried out on both the Cardan joint and the pedestal or foot member and accordingly are rather time-consuming and expensive.

Moreover the height of the pedestal or foot member would as much increase the level of the pivot axes or pins to the same extent or by the same amount with respect to the base member.

Figure 2:
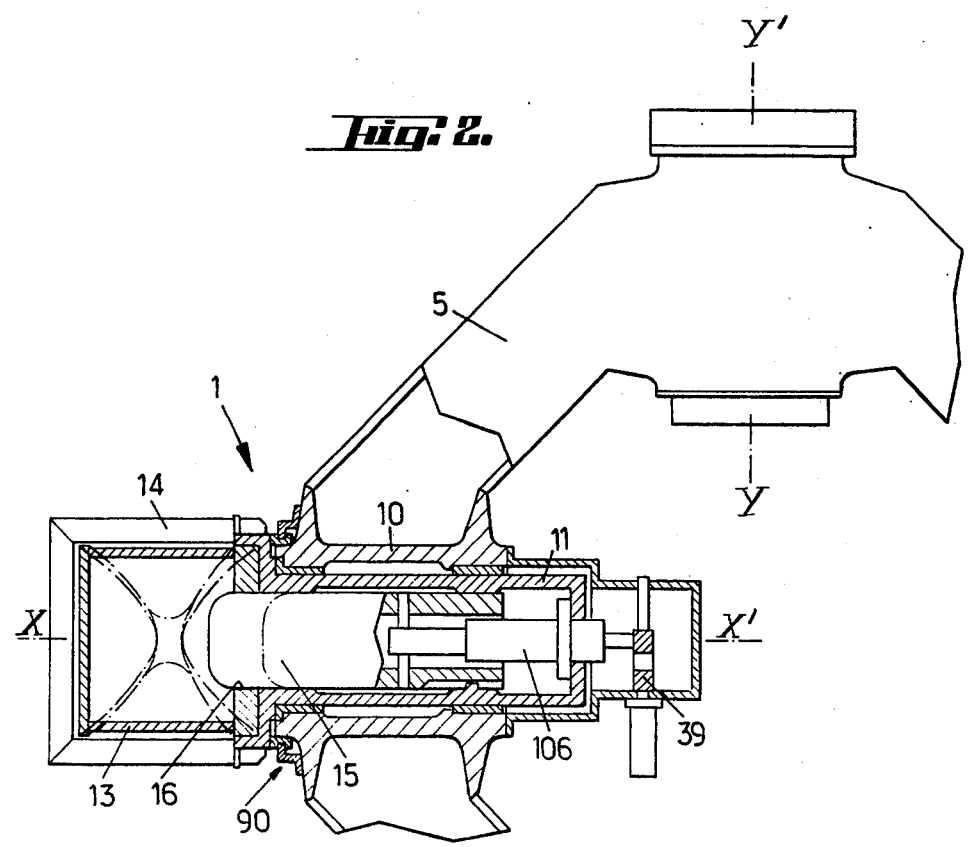
FIG. 2 is a fragmentary top view drawn on a larger scale with parts broken away showing the cross-pin spider of the Cardan joint with its connection to an arm-like support or post of the base member in accordance with the invention.

With the view to simplify the construction and according to the invention, the cross-pin spider 5 of the universal Cardan joint coupling is directly connected to both upright or vertical arm-like supports or posts secured to the base member 3 and horizontally aligned in substantially registering relationship along one XX' of the two orthogonal centre-line axes XX' and YY' of said spider (FIGS. 1 and 2), by means of two lock-bolts 15, respectively, displaceable along said axis XX'.

Said supports are advantageously shaped as prongs 13 formed with pointed upper tips or top ends.

The pivot pins 11 forming the gudgeons or trunnions of the spider which are arranged along the axis XX' and which carry and are journalled in the corresponding bearings 10 of the spider 5 of the universal Cardan joint coupling along said axis XX', are hollow so as to contain the lock-bolts 15 as well as power rams or like linear cylinder- and -piston actuators 106 adapted to drive these lock-bolts according to axial displacements in order to cause them to engage corresponding bolt-clasps or keepers 16 provided in mutually confronting relationship as recesses or holes within the side walls of said arm-like supports.

There are moreover provided means enabling the spider to be readily positioned when being installed in front of the arm-like supports. For this purpose such means may consist for instance of guide frames such as diagrammatically shown at 14, which are adapted to be slipped over and onto the arm-like supports, each guide frame being fast with a trunnion or like hollow pivot pin 11.

Thus once the base member 3 has been sunk down and positioned on the sea bed together with its arm-like supports 13 integral therewith, the column is lowered and the spider 5 of the Cardan joint is drawn near the base member so that its guide means 14 be located above the pointed top ends of the arm-like supports and then after the whole construction has been moved downwards in place, the lock-bolts 15 are operated by means of the actuators 106. The lock-bolts are then blocked axially in the mounting position by means of cotter pins 39 extending across and behind the free end of the piston rod of the actuator projecting inwards from the actuator cylinder. The spider of the universal Cardan joint coupling may then freely rotate or swing about its trunnions or pivot pins.

Disassembling of the Cardan joint coupling or disconnecting the column from its base member is performed in the same simple manner by operating the power rams or actuators 106 in the direction reverse from the foregoing one after disengagement of the cotter pins 39 whereby the lock-bolts 15 are disengaged or retracted from their bolt-clasps 16.

The reference numeral 90 designates additional parts provided on the trunnion or pivot pin 11 and on the spider 5, respectively, to prevent the trunnions or pivot pins from moving axially out of their housings or bearings as long as the whole assembly has not been mounted on the arm-like supports.

It is thus possible by using any one of the embodiments disclosed herein to install off-shore plants having articulated columns in a simpler, more economical and faster way as hereintofore by means of less bulky or cumbersome and less heavy elements.

It should be noted in particular that all the mechanical functions relative to the pivotal connection as well as to the locking are concentrated on one and a same component part, namely on the spider of the universal Cardan joint coupling in the examplary embodiment described hereinabove.

Moreover owing to the omission of the foot member or pedestal provided in the prior art constructions the level of the pivot axes X and Y may be lowered with respect to the base member.

Referring to FIGS. 3 to 6 there is shown a second embodiment of the pivotal connecting system 1 according to the invention, connecting a column 2 in particular of an off-shore working plant for exploiting or developing a submarine oil-field to a base member 3 resting on or anchored to the sea bottom.

The pivotal connecting system 1 comprises a universal Cardan joint coupling 4 enabling the column 2 to be pivotally connected to the base member 3 for swinging motions about two axes of rotation XX', YY', respectively, extending at right angles to each other and carried by the column and by the base member, respectively.

The universal Cardan joint coupling 4 comprises an annular spider of prismatic or polygonal or cylindrical configuration 5 consisting for instance of two ring-like plates arranged in substantially coaxial relationship, namely an upper or top plate 6 and a lower or bottom plate 7 the confronting peripheral outer and inner edge portions of which are interconnected by outer side-wall plates 8 and inner side-wall plates 9, respectively.

The preferably coplanar or intersecting pivot axes XX', YY' extend through the centre or middle point of the spider 5 of the universal Cardan joint coupling and in parallel relation to the top plate 6 and to the bottom plate 7 of the spider. Two coaxially aligned bearings 10 extend through and are made fast with the spider 5 of the universal Cardan joint coupling along each pivot axis XX' or YY', respectively. With each bearing 10 is associated a set of elements enabling the universal Cardan joint coupling 4 to perform the following functions: pivotal connection of the column to the base member, locking of the spider of the universal Cardan joint coupling to the base member and to the column, respectively, and connection between at least two fluid-conveying ducts or pipe-lines borne by the base member and by the column, respectively.

In view of the symmetrical relationship of the construction with respect to the pivot axes XX', YY', only that set of elements which is associated with a bearing 10 coaxial with the pivot axis XX' will be described in greater detail hereinafter.

Figure 5:
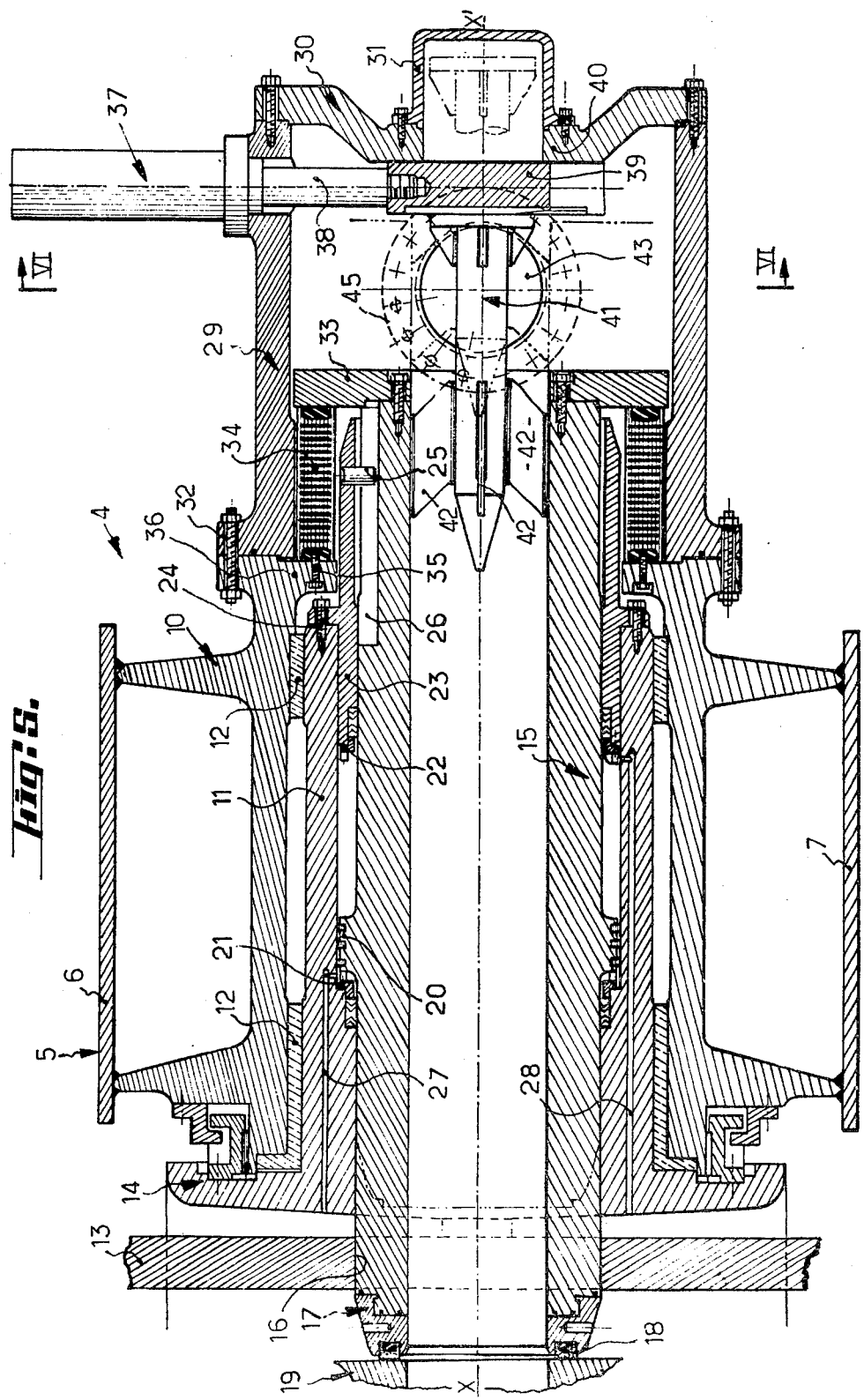
FIG. 5 is a cross-sectional view drawn on a larger scale and taken upon the line V—V of FIG. 4.

Referring in particular to FIG. 5, a hollow gudgeon or trunnion 11 forming a pivot pin coaxial with said pivot axis is rotatably mounted or journalled within the corresponding bearing 10 by means of bushings 12. This gudgeon or trunnion 11 is connected to a substantially vertical arm-like support 13 forming a guiding and and holding element fast with the base member 3 and comparable with one arm or prong of the stationary or lower yoke for the Cardan coupling. For this purpose the trunnion 11 is rigidly connected with its outer end to a sleeve or collar 14 adapted to be slipped over the corresponding guiding and holding element 13. Such a connection of the trunnion 11 to its guiding and holding element 13 is held against motion by means of a retractable lock-bolt 15 consisting of a tubular or hollow locking pin open at its two opposite ends, axially movable along the corresponding pivot axis and insertable into an opening 16 provided in the associated guiding and holding element 13.

At the outer end of the locking bolt 15 is secured, for instance screw-threaded, a ring-like head 17 alined in coaxial relationship with the lock-bolt and the terminal front face at the free end of which carries an annular gasket or like packing or seal 18. This gasket or seal 18 is adapted to engage or contact in pressed sealing relationship the annular terminal end face of a duct or a pipe-line 19 carried by the base member 3.

The lock-bolt 15 is formed on its outer peripheral surface with a collar or shoulder 20 forming a double-acting or reversible drive piston which is in fluid-tight sliding contact with the inner wall surface of the corresponding trunnion or pivot pin 11. Two stop means 21, 22 are provided in axially spaced relationship on the inner wall surface of the trunnion 11 with the view to limiting the stroke of the lock-bolt 15. The stop means 21 consists of a shoulder defined by a reduction in the inner diameter of the trunnion 11 whereas the stop means 22 consists of the terminal end face of an auxiliary sleeve 23 coaxially alined with the pivot axis XX' and partially mounted inside of the trunnion 11 about the lock-bolt 15. This sleeve 23 is in sealing engagement with the lock-bolt 15 and the trunnion 11, respectively, through its radially inner and outer side-wall surfaces. This sleeve 23 is secured to the trunnion 11 by means of screws 24 for instance. From the radially inner wall surface of the auxiliary sleeve 23 is projecting at least one guide pin or like locating peg or dowel 25 which cooperates with an axially extending groove 26 formed in the radially outer wall surface of the lock-bolt 15 for holding the latter against rotation.

Two pressure fluid feed ducts 27, 28 provided in the trunnion 11 open adjacent to both opposite ends, respectively, of the annular chamber defined by the radially inner wall surface of the trunnion 11 and by the radially outer wall surface of the lock-bolt 15 as well as by both stop means 21, 22, this chamber being separated into two variable volume chambers by the collar 20 of the lock-bolt 15. These pressure fluid feed ducts communicate with a pressure fluid supply source (not shown).

The inner end of the bearing 10 rigidly connected to the spider is extended by a sleeve member 29 the free end of which is closed by a cover plate 30. This cover plate is formed with a central boss portion 31 projecting outwards to the outside of the sleeve member 29. This sleeve member 29 is fastened to the bearing 10 by means of fastening bolts 32 for instance.

At that inner end of the lock-bolt 15 which projects into the sleeve member 29 is mounted an annular flange plate 33 coaxially aligned with the pivot axis XX' and the central aperture of which has substantially the same diameter as the inner diameter of the lock-bolt 15. A resiliently deformable sealing packing 34 such as a ring-like sleeve forming a torsion or twistable joint is mounted in coaxial relation to the lock-bolt 15 within the space defined by the radially inner wall surface of the sleeve member 29 and by the radially outer wall surface of the auxiliary sleeve 23 which projects into the sleeve member 29. That sealing torsion joint 34 is for instance secured with one end thereof by means of a screw 35 against an annular inner shoulder 36 provided towards the adjacent end of the bearing 10 whereas with its other or opposite end the torsion sealing joint 34 is in pressed simple bearing engagement with the adjacent side face of the annular plate 33 made fast with the lock-bolt 15 when the latter is in its outward extended locking position.

Referring in particular to FIG. 6, the sleeve member 29 carries a pressure fluid operated power-ram or like linear cylinder- and -piston actuator 37 the piston-rod 38 of which may extend into the sleeve member along a direction perpendicular to the pivot axis XX'. A blocking element 39 is secured at the end of the piston-rod 38 for keeping the lock-bolt 15 immovable in its operative locking position. This blocking element 39 is adapted to contact with its two opposite side faces extending at right angles to the pivot axis XX' that central portion 40 of the cover 30 which surrounds the boss 31 and which projects slightly into the sleeve member 29 and the terminal end face of an auxiliary pin 41, respectively, forming an extension of the lock-bolt 15 beyond the annular plate 33 made fast with said lock-bolt. This auxiliary pin 41 has a smaller diameter than the inner diameter of the lock-bolt and projects partially into said lock-bolt while being connected to the latter by means of gussets or like fins or wings 42. It should be pointed out that even when the lock-bolt 15 is in engagement with the blocking element 39 through the agency of the auxiliary pin 41 the lock-bolt 15 may turn about its longitudinal centre-line with respect to the associated blocking element.

An opening 43 is formed in the sleeve member 29 so as to provide communication between the inner space of the sleeve member with the adjacent end of a stiff outer pipe 44 secured to the sleeve member by a flange 45. This pipe 44 is for instance secured with its other end to one of the sleeve members 29 associated with the other pivot axis YY' (FIG. 4).

All of the elements which have just been described with respect to the pivotal connection of the universal Cardan joint coupling along its pivot axis XX' associated with the base member are also provided at the pivotal connection of the universal Cardan joint coupling along its other pivot axis YY' associated with the column. Along the pivot axis YY' however each trunnion 11 is rigidly connected with its outer end to a channel-like guide element 50 having a U-shaped cross-section. Both guide elements 50 do not cooperate with guiding and holding arm-like supports 13 rigidly connected to the base member as previously stated but with two arms 51, 51a, respectively, forming the prongs of a yoke, clevis or like fork which are provided in extension of the lower end of the column in spaced relationship on either side of the spider 5 of the universal Cardan joint coupling. Each arm 51 or 51a is for instance formed with a bore extending therethrough in coaxial relation to the pivot axis YY' to provide communication between the associated lock-bolt 15 and a rigid outer pipe 52 or 52a borne by the column (FIG. 3).

With such an arrangement it is possible to interconnect at least two pipes 19, 19a carried by the base member with two pipes 52, 52a, respectively, carried by the column. The pipe 19 carried by the base member is connected to the pipe 52 carried by the column through the agency of two rotary joints, respectively, mounted in coaxial relation to both pivot axes XX', YY', respectively. Each rotary joint comprises one part made fast with the spider structure (bearing 10, sleeve member 29) and another part consisting of a lock-bolt 15 with a sealing torsion joint interposed between these two parts. Both rotary joints associated with the pipe 19 and with the pipe 52, respectively, communicate with each other through the medium of a stiff connecting pipe 44. The pipe 19a and the pipe 52a are likewise interconnected by the two other rotary joints associated with the two pivot axes XX', YY', respectively.

FIGS. 7 to 10 illustrate an alternative embodiment which is a modification of the embodiment shown in FIG. 3.

This alternative embodiment differs essentially from the second embodiment by the means which connect that part of each rotary joint which is fast with the base member or with the column to that part thereof which is fast with the universal Cardan joint coupling.

As previously in view of the existing symmetrical relationship only one of the rotary joints associated with the pivot axis XX' will be described hereinafter.

Each bearing 10 is extended at its inner end by both legs 60 of a clevis-like bracket 61 the transverse wall 62 of which extends at right angles to the pivot axis XX'. Between both legs 60 of the clevis-like brackets 61 is provided a casing 63 movable in a direction at right angles to the pivot axis XX' along guide rails 64 mounted on the confronting opposite side faces of the two plates forming the legs 60 of the clevis-like bracket 61. These guide rails 64 are extended towards one side of the clevis-like bracket 61 to the spider 5 of the universal Cardan joint coupling and are secured to the spider at the inner side-wall plates 9 interconnecting both annular end plates 6, 7 of the spider.

A sealing annular torsion joint packing 34 is mounted in coaxial relation to the pivot axis XX' within that casing or box 63 which is of substantially parallelepipedic shape and consists of two half-shells assembled together. On either side of this torsion joint 34 and in coaxial relation thereto are mounted two axially movable sleeve elements 66, 67. The sleeve element 66 is formed at its end adjacent to the torsion joint 34 with a flange 68 engageable in simple pressed fluid-tight relationship by one end of said sealing joint or packing. At its other end which projects outside of the box 63 through an opening 69 coaxial with the pivot axis XX', the sleeve member 66 is formed with a flange 70 adapted to engage in simple pressed bearing fluid-tight relationship a coaxial annular plate 71 mounted at the adjacent end of the associated locking-bolt 15. The sleeve member 67 is formed, at one end thereof, with a flange 72 engageable in simple bearing pressed fluid-tight relationship by the other end of the sealing torsion joint packing 34. That other end of the sleeve element 67 which projects outward from the casing 63 through an opening 69 which is coaxial with the pivot axis XX' terminates in a flange 63 adapted to engage in simple pressed bearing relationship the transverse wall portion 62 of the clevis-like bracket 61.

A sleeve 74 is coaxially mounted about the sealing torsion joint packing 34 between both sleeve elements 66 and 67. That sleeve 74 is of a shorter length than that of the sealing torsion joint packing 34 and its two ends form two stops or abutments, respectively, for the two axially movable sleeve elements 66 and 67 in order to avoid any crushing or excessive compression of the sealing torsion joint packing 34.

Both sleeve elements 66 and 67 may be moved towards each other with an attendant compression or squeezing of the sealing torsion joint packing 34 by means of several pressure fluid-operated power-rams or like linear cylinder- and -piston actuators 75 mounted within the casing 63. The piston-rods of these actuators 75 which extend in parallel relation to the pivot axis XX' are secured for instance to the flange 68 of the sleeve element 66. Such an axial motion of both sleeve elements 66 and 67 towards each other enables each box-like casing 63 to be passed through and to be inserted into its clevis-like bracket 61 between the transverse wall portion 62 of the latter and the plate 71 mounted at the end of the corresponding lock-bolt 15 when the latter is in its outward extended operative locking position as set forth hereinafter.

A guide sleeve 76 coaxially aligned with the pivot axis XX' is connected with one end to the peripheral surface of the annular plate 71 secured to the associated lock-bolt 15. This sleeve 76 extends into the associated bearing 10 between the latter and the auxiliary sleeve 23 rigidly secured to the bearing. With its outer peripheral surface this guide sleeve 76 is in sliding engagement with a ring member 77 mounted on the radially inner wall surface of the bearing 10 and towards the end thereof.

Figure 7:
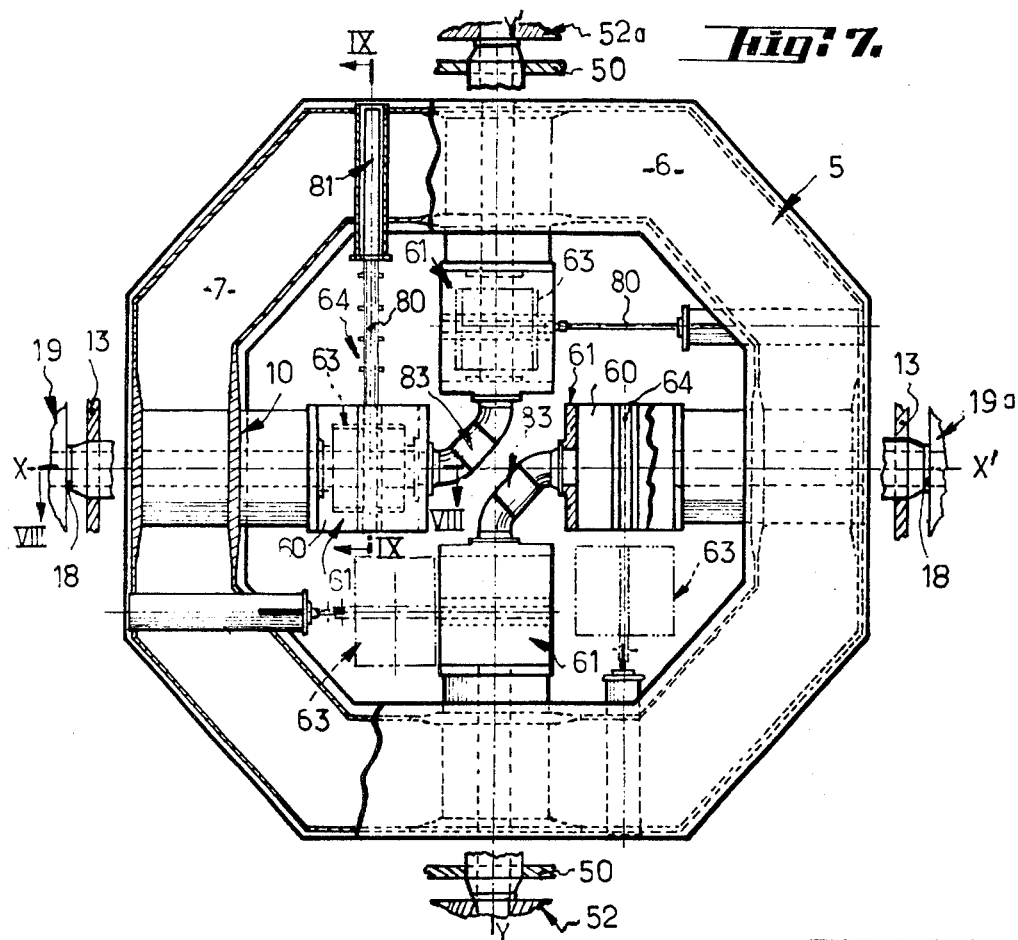
FIG. 7 is a fragmentary bottom view, with parts broken away, illustrating an alternative embodiment forming a modification of the pivotal connecting system shown in FIG. 3.
Figures 9, 10:
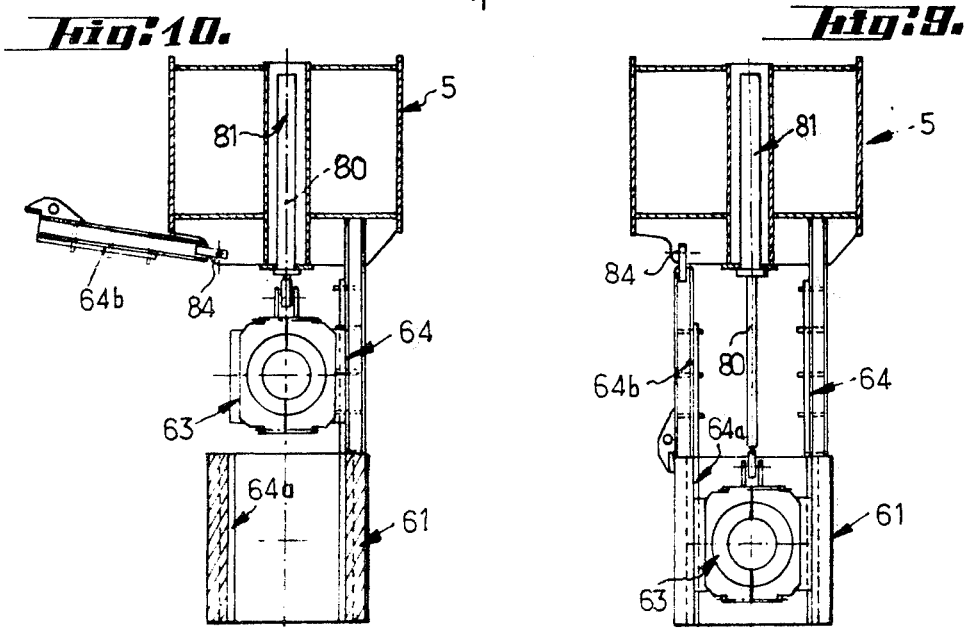
FIG. 9 is a cross-sectional view taken upon the line IX—IX of FIG. 7.
FIG. 10 is substantially similar to FIG. 9.

Each box-like casing or housing 63 is rigidly connected to the piston-rod 80 of a pressure fluid-operated power-ram or like linear cylinder- and -piston actuator 81 mounted to extend at right angles to the pivot axis XX' and the cylinder of which is for instance rigidly connected to the spider 5 of the universal Cardan joint coupling (FIGS. 7, 9 and 10). The transverse wall portion 62 of each clevis-like bracket 61 is formed with a central aperture 82 which communicates with the adjacent end of a rigid connecting pipe 83 the other end of which communicates with the opening 82 provided in one of the two clevis-like brackets associated with the pivot axis YY' (FIG. 8).

Referring to FIGS. 9 and 10 it should be noted that the guide rail associated with one of the legs 60 of each clevis-like bracket 61 consists of two parts or sections 64a, 64b. The section 64a located at the clevis-like bracket 62 is extended up to the spider 5 of the universal Cardan joint coupling by the section 64b which is pivotally mounted to swing about a pivot 84 carried by the spider 5 of the universal Cardan joint coupling thereby enabling the associated box or housing 63 to be mounted.

As previously it is possible to provide the connection between at least two pipes 19, 19a borne by the base member and two pipes 52, 52a borne by the column, respectively. The pipe 19 is connected to the pipe 52 through two rotary joints respectively associated with both pivot axes and by a connecting pipe 83 interconnecting both rotary joints. Each rotary joint consists of a first part made fast with the spider of the universal Cardan joint coupling (bearing 10, clevis-like bracket 61, sleeve element 67 of the box 63) and of another part made fast with the base member or with the column (sleeve element 66 of box 63 and associated lock-bolt 15) with the interposition of a sealing torsion joint 34. The pipes 19a and 52a communicate with each other likewise through the agency of two other rotary joints interconnected by a connecting pipe 83.

It should be noted that the free cross-sectional area of fluid passage-way between the pipes is substantially constant thereby enabling a scraping tool such as a piston-like scraper to be driven therethrough.

The method of mounting the pivotal connecting system according to the first embodiment shown in FIGS. 3 to 6 is the following.

The spider 5 of the universal Cardan joint coupling, for instance already secured and locked to the column 2 along the pivot axis YY' is brought to the vertical of the base member 3 with the locking bolts 15 associated with the pivot axis XX' being in their inoperative unlocked positions i.e. these lock-bolts 15 do not project outwards from the outer ends of the corresponding trunnions 11 (but are in their retracted position shown in chain dotted lines in FIG. 5). In that position the annular plate 33 of each lock-bolt 15 is not bearing in pressed fluid-tight relationship against the associated annular sealing torsion joint packing 34 and the free end of the rod 41 which is in extension of each lock-bolt 15 projects into the boss 31 of the cover 30 associated with the sleeve 29. Each blocking element 39 is then in the upper position (with the piston-rod 38 being retracted) to enable rod 41 to extend into the boss 31.

The positioning of the spider 5 on the base member 3 is carried out by slipping the collars or frame means 14 of the trunnions 11 over the corresponding guiding and holding elements 13 which are fast with the base member 3.

Then each lock-bolt 15 is moved by being driven through the pressure fluid fed into the duct 28 of the associated trunnion 11. This pressure fluid then exerts a drive force upon the adjacent face of the collar 20 thereby moving the lock-bolt 15 along to extend or project outwards with the view to locking the spider 5. During that travel the free end or head 17 of each lock-bolt moves through the opening 16 of the associated guiding and holding support 13 so as to come into pressed fluid-tight engagement through the sealing joint 18 with the terminal end face of the rigid pipe or duct 19 fitting the base member 3. In that position the collar 20 of each lock-bolt 15 is substantially abutting against the stop means 21 of the associated trunnion 11 whereas the annular plate 33 of each lock-bolt 15 is caused to engage in fluid-tight bearing relationship the adjacent terminal end face of the sealing torsion joint packing 34 while partially compressing or squeezing the latter.

With the spider 5 of the universal Cardan joint coupling being now locked in position on the guiding and holding elements of the base member 3 the power-rams 37 are energized with pressure fluid so as to bring each blocking element 39 in engagement with the free end of the rod 41 rigidly connected with the corresponding lock-bolt 15 and with the central portion 40 of the cover 30, respectively, mounted at the end of the associated sleeve 29. Thus it is no longer necessary to keep supplying pressure fluid to the ducts 28 of the trunnions 11 because each lock-bolt is retained in its operative outward extended locking position by the blocking element 39 associated therewith.

When the column 2 is oscillating about the pivot axis XX' associated with the base member 3 the spider 5 of the universal Cardan joint coupling swings about both trunnions or pivot-pins coaxially aligned with said pivot axis. Each sealing torsion joint packing 34 tightly cooperating through one end thereof with the associated bearing 10 forming part of the spider then is effective to prevent its other end which is bearing against the plate 33 fast with the corresponding lock-bolt 15 from rotating the latter with respect to the base member 3.

With the column 2 swinging about the pivot axis YY' associated with the column the lock-bolt 15 coaxially aligned with this pivot axis will turn in the corresponding bearings 10 whereas the spider 5 remains stationary owing to the provision of the sealing torsion joint packings 34 coaxially aligned with the pivot axis YY'.

To unlock the spider 5 of the universal Cardan joint coupling along the pivot axis XX' or YY' the same operating steps are carried out but in the reverse order or sequence by causing the associated lock-bolts 15 to be retracted through pressure fluid injection into the ducts 27 of the associated trunnions or pivot pins 11 instead of feeding pressure fluid into the ducts 28 as in the previous case.

The process of mounting the pivotal connecting system according to the alternative embodiment forming a modification of the second embodiment of the invention is the following with reference to FIGS. 7 to 10.

To position the spider 5 of the universal Cardan joint coupling on the base member 3 the same operating steps as those described for the second embodiment are carried out. In that instance the casings 63 enclosing the sealing torsion joint packings 34 are located outside of the corresponding clevis-like brackets 61 (FIG. 10) since the associated lock-bolts 15 are then in their inwards retracted inoperative or unlocking positions and thus partly project into the clevis-like brackets 61.

Then each lock-bolt is actuated to move as previously with the view on one hand to making a fluid passage-way connection with the pipe bound to the base member and on the other hand to locking the spider 5 of the universal Cardan joint coupling to the base member. Once this operating step has been completed the lock-bolts 15 and in particular the plates 71 fast with these lock-bolts are disengaged from the corresponding clevis-like brackets 61.

Prior to positioning each casing 63 within its associated clevis-like bracket 61 the power-rams 75 of each casing are actuated through remote control in order to move both sleeve elements 66 and 67 to each casing axially towards each other while compressing or squeezing the sealing torsion joint packing 34 mounted therebetween. This operating step causes the distance separating both end flanges 70 and 72 from each other to be decreased to a spacing smaller than that separating the plate 71 of the corresponding lock-bolt 15 from the transverse wall portion 72 of the clevis-like bracket 61 associated with this lock-bolt. Therefore each casing 63 under the action of its drive power-ram 80 may be moved into position within its associated clevis-like bracket 61. Then the power-rams 75 of each casing 63 are no longer fed with pressure fluid thereby causing the sealing torsion joint packings 34 to automatically expand in the radial direction. Such an expansion of the sealing torsion joint packings provide for a fluid-tight pressed engagement on the one hand between the flange 70 of the sleeve member 66 and the plate 71 of the corresponding lock-bolt 15 and on the other hand between the flange 73 of the sleeve member 67 and the transverse wall portion 62 of the associated clevis-like bracket 61.

During the swinging motions of the column about the pivot axis XX' associated with the base member 3 the lock-bolts 15 and the sleeve members 66 of the casings 63 associated with this pivot axis remain stationary whereas the spider 5 of the universal Cardan joint coupling, the sleeve members 67 of said casings 63 and the clevis-like brackets 61 associated with that pivot axis are swinging about the latter. The sealing torsion joint packings 34 associated with the pivot axis XX' prevent the sleeve elements 66 and accordingly the associated lock-bolts 15 from being rotated by the sleeve elements 67.

During the oscillations of the column 2 about the pivot axis YY', the spider 5, the clevis-like brackets 61 and the sleeve elements of the casings 63 associated with this pivot axis remain stationary whereas the lock-bolts 15 and the sleeve elements 66 of the casings 63 associated with this pivot axis are following the motions of the column. In such a case the sealing torsion joint packings 34 associated with the pivot axis YY' prevent the sleeve elements 67 from being rotated by the sleeve elements 66.

It should be pointed out that this alternative embodiment of the invention offers advantages with respect to the second embodiment in particular with respect to the operating steps for changing or replacing a damaged sealing torsion joint packing.

It is indeed only necessary to remove or withdraw the casing 63 enclosing the damaged sealing torsion joint packing from its associated clevis-like bracket in order to have access to the sealing joint packing. Moreover such a removal or withdrawal requires no disconnection since the casing in its normal working position is only bearing against the associated clevis-like bracket and lock-bolt, these bearing contacts being removed by the actions of the power-rams 75 housed within the casing during the operating step for removing or withdrawing the casing. On the contrary according to the second embodiment the replacement of a sealing torsion joint packing requires in particular an operating step to perform the disconnection between the bearing 10 and the sleeve 29 inside of which is housed the sealing torsion joint packing.

It should be pointed out that the sealing torsion joint packings used and previously described are for instance made from neoprene or like rubber or elastomeric material hooped with steel rings.

It is to be understood that the invention should not be construed as being limited to the embodiments described and shown which have been given by way of illustrative examples only but comprises all the technical equivalents of the means described as well as their combinations if same are carried out and used within the scope of the appended claims.

What is claimed is:

1. A pivotal connection device adapted for connecting one end of an off-shore articulated working column to a base member resting on the sea bed, said device comprising a pair of orthogonally extending pivot axes, each pivot axis extending from opposed sides of said device, means fixedly mounted on said base member for supporting one of said pivot axes, a pair of lock-bolt members at opposed sides of said device mounted for movement along and substantially coaxially with said one of said pivot axes and a bolt-keeper means provided in said support means for bounding said lock-bolts to said support means whereby said device is pivotally mounted to said support means with respect to said one pivot axis.

2. A device according to claim 1, wherein said pivotal connection is a universal Cardan joint coupling comprising a cross-pin spider and said pivot axis bound to said support means is one of the two perpendicular pivot axes of the said cross-pin spider of said universal Cardan joint coupling.

3. A device according to claim 2, comprising two substantially aligned trunnion-like pivot pins about which said spider of said universal Cardan joint coupling may swing, said trunnion-like pivot pins being hollow and containing said two lock-bolts, respectively.

4. A device according to claim 3, wherein said two trunnion-like pivot pins also contain powered actuator means adapted to operate said two lock-bolts, respectively.

5. A device according to claim 3, further comprising guide means carried by said trunnion-like pivot pins and adapted to guide the downward motion of said spider of said universal Cardan joint coupling in order to position said lock-bolts in substantially registering relation to said bolt keepers, respectively.

6. A device according to claim 5, wherein said supports consist each one of a substantially upright post formed with a pointed top end and said guide means are collar-like frames adapted to be slipped over said posts, respectively.

7. A pivotal connection device adapted to connect an off-shore articulated working column to a base member resting on the sea bed, said device comprising a universal Cardan joint coupling with a cross-pin spider pivotally connected to said base member and to said column along two perpendicular pivot axes, respectively, and connecting means for interconnecting fluid-conveying pipes provided on said base member and said column, respectively, wherein said spider is removably connected to one of said base member and column through a connecting arrangement which may be held against motion by means of two selectively retractable lock-bolts arranged and movable in substantially aligned registering coaxial relationship with the pivot axes between said spider and said one of said base member and column, said pipe connection being effected through the agency of said spider and including at least one rotary joint forming a fluid passage-way coaxial with said pivot axis, said rotary joint being mounted between said spider and said one of said base member and column and comprising one part made fast with said spider and another part consisting of the adjacent lock-bolt which is coaxial therewith.

8. A device according to claim 7, wherein said spider of said universal Cardan joint coupling is detachably connected to the other one of said base member and said column through a connecting arrangement which may be held against motion by means of two selectively retractable lock-bolts located and movable in substantially aligned registering coaxial relationship with the pivot axis between said spider and said other one of said base member and column.

9. A device according to claim 7, wherein said pipe connection comprises at least one pair of rotary joints forming fluid passage-ways respectively coaxial with both pivot axes of said universal Cardan joint coupling and mounted the one between said base member and said spider and the other one between said column and said spider.

10. A device according to claim 7, wherein said lock-bolt which forms one part of one aforesaid rotary joint consists of a tubular hollow pin open at both of its opposite ends and removably connectable in fluid-tight relationship to either of said base member and said column, said spider being connected to said pipe provided on either of said column and base member.

11. A device according to claim 10, wherein the rotatable connection between both aforesaid parts of each rotary joint consists of a resiliently deformable sealing packing mounted between both parts of said rotary joint.

12. A device according to claim 11, wherein said sealing packing is fast with one of said two parts of each rotary joint and is in pressed fluid-tight sliding engagement with the other part while forming a sealing torsion joint packing.

13. A device according to claim 12, wherein said sealing joint packing consists of an annular sleeve coaxially surrounding said lock-bolt forming one aforesaid part of each rotary joint while being secured with one end thereof to said spider and with its other end engaging in simple pressed bearing relationship a mating flange-like annular portion of said lock-bolt.

14. A device according to claim 13, wherein said lock-bolt forming one aforesaid part of each aforesaid rotary joint carries at its outer end an annular sealing gasket adapted to come into engagement in pressed fluid-tight relationship with the terminal end face of an aforesaid pipe bound to one of said base member and column.

15. A device according to claim 14 wherein said lock-bolt forming one aforesaid part of each aforesaid rotary joint is mounted in coaxially sliding relationship within one hollow trunnion-like pivot pin belonging to one pivot axis of said universal Cardan joint coupling and rotatably mounted within a bearing forming part of the structure of said spider, said lock-bolt being formed, on its radially outer peripheral surface, with a radially outward projecting collar forming the piston of a double acting ram-like drive actuator within an actuator cylinder constituted by said hollow trunnion-like pivot pin, said piston being movable between two stop means rigidly connected to said trunnion-like pivot pin.

16. A device according to claim 15, wherein said actuator cylinder is fed with pressure fluid through two ducts formed within said trunnion-like pivot pin and opening into said cylinder near said stop means, respectively.

17. A device according to claim 15, wherein one of said stop means consists of an abutment adapted to limit the extent of squeezing of said sealing gasket carried by the associated lock-bolt as well as of said sealing torsion joint packing of said rotary joint.

18. A device according to claim 17, wherein each aforesaid rotary joint comprises a blocking element for blocking the associated lock-bolt in its operative locking position, said blocking element having such a position as to keep the sealing gasket carried by said associated lock-bolt and said sealing torsion joint packing associated with said rotary joint in a compressed condition.

19. A device according to claim 18, wherein each aforesaid blocking element is rigidly connected to the piston-rod of a cylinder- and -piston actuator carried by said spider and is movable in a direction at right angles to the corresponding pivot axis so as to be engageable with its two opposite side faces extending at right angles to said pivot axis with the inner end of the associated lock-bolt and with a wall portion, respectively, extending at right angles to said pivot axis, said wall portion being carried by said spider and closing off in fluid-tight relationship the inner end of the corresponding aforesaid rotary joint.

20. A device according to claim 7, wherein at least two aforesaid rotary joints, forming fluid passage-ways coaxial with both pivot axes, respectively, of said universal Cardan joint coupling, communicate with each other through the agency of a stiff connecting pipe rigidly connecting to said spider.

21. A device according to claim 12, wherein said sealing joint packing consists of an annular sleeve mounted within a casing coaxially aligned with said lock-bolt, said casing being insertable between one flange provided at the inner end of said lock-bolt and a transverse wall portion of a clevis-like bracket forming part of the structure of said spider.

22. A device according to claim 21, wherein on either side of said sealing torsion joint packing are mounted two sleeve elements coaxially aligned with said packing, both sleeve elements projecting with their opposite ends outwards from and out of said casing so as to come into engagement in fluid-tight pressed relationship under the action of said sealing torsion joint packing in its pre-compressed condition with said flange and said transverse wall portion of said clevis-like bracket, respectively, the adjacent ends of said sleeve elements being in pressed fluid-tight engagement with both ends of said sealing torsion joint packing, respectively.

23. A device according to claim 22, wherein inside of said casing are mounted in parallel relation to the corresponding pivot axis, actuator means effective to act upon one of said sleeve elements in order to move said sleeve elements axially towards each other while compressing said sealing torsion joint packing thereby enabling said casing to be inserted and positioned when the lock-bolt of said rotary joint is in its operative locking position.

24. A device according to claim 21, wherein said casing is movable in parallel relation to the leg portions of said associated clevis-like bracket in a direction at right angles to the corresponding pivot axis through the agency of a pressure fluid operated power-ram carried by the structure of said spider while being guided by and riding on guide rails extending between said clevis-like bracket and said spider.

25. A device according to claim 21, wherein said transverse wall portion of each clevis-like bracket is formed with an opening communicating with an aperture provided in said transverse wall portion of one of said clevis-like brackets associated with the other pivot axis, through the medium of a stiff connecting pipe.

26. A device according to claim 7, wherein the cross-sectional fluid passage-way area of any two aforesaid interconnectable pipes carried by said base member and by said column, respectively, is substantially constant throughout to enable scraper means to be driven therethrough.

* * * * *